US010880100B2

(12) United States Patent
Sovio et al.

(10) Patent No.: US 10,880,100 B2
(45) Date of Patent: Dec. 29, 2020

(54) APPARATUS AND METHOD FOR CERTIFICATE ENROLLMENT

(71) Applicant: Huawei Technologies Co., Ltd., Shenzhen (CN)

(72) Inventors: Sampo Sovio, Helsinki (FI); Janne Hirvimies, Kista (SE); Valentin Manea, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/055,732

(22) Filed: Aug. 6, 2018

(65) Prior Publication Data

US 2018/0375667 A1    Dec. 27, 2018

Related U.S. Application Data

(63) Continuation of application No. PCT/EP2016/066719, filed on Jul. 14, 2016.

(51) Int. Cl.
*H04L 29/06* (2006.01)
*H04L 9/32* (2006.01)
(Continued)

(52) U.S. Cl.
CPC .......... *H04L 9/3268* (2013.01); *G06F 21/44* (2013.01); *G06F 21/53* (2013.01); *H04L 9/006* (2013.01); *H04L 9/0822* (2013.01); *H04L 9/0825* (2013.01); *H04L 9/0894* (2013.01); *H04L 9/321* (2013.01); *H04L 9/3247* (2013.01);
(Continued)

(58) Field of Classification Search
None
See application file for complete search history.

(56) References Cited

U.S. PATENT DOCUMENTS

2009/0183000 A1    7/2009  Krig
2013/0091353 A1*   4/2013  Zhang .............. H04L 9/3268
                                                 713/156
(Continued)

FOREIGN PATENT DOCUMENTS

CN    101005359 A    7/2007
CN    104408622 A    3/2015
(Continued)

OTHER PUBLICATIONS

CN/201680087696.3, Office Action/Search Report, dated Jun. 29, 2020.
(Continued)

*Primary Examiner* — Andrew J Steinle
(74) *Attorney, Agent, or Firm* — Leydig, Voit & Mayer, Ltd.

(57) ABSTRACT

An apparatus includes a processor coupled to a memory wherein the processor and the memory are configured to provide a secure execution environment. The memory includes a shared secret value. The processor is configured to receive a certificate, wherein the certificate includes a device identifier and a digital signature. The processor validates the certificate based on the digital signature and the device identifier, recovers a cryptographic key based on the shared secret value and the device identifier, and performs a cryptographic operation based on the recovered cryptographic key.

21 Claims, 5 Drawing Sheets

(51) Int. Cl.
*G06F 21/44* (2013.01)
*H04L 9/08* (2006.01)
*G06F 21/53* (2013.01)
*H04L 9/00* (2006.01)

(52) U.S. Cl.
CPC .......... *H04L 63/0876* (2013.01); *H04L 63/12* (2013.01); *G06F 2221/2149* (2013.01)

(56) References Cited

U.S. PATENT DOCUMENTS

2014/0325240 A1 10/2014 Srinivasan et al.
2015/0156176 A1* 6/2015 Collinge ............. H04L 63/0428
713/168

FOREIGN PATENT DOCUMENTS

| CN | 104639322 A | 5/2015 | |
| EP | 2538606 A1 * | 12/2012 | ........... H04L 9/3273 |
| EP | 2538606 A1 | 12/2012 | |

OTHER PUBLICATIONS

K. Moriarty et al., "PKCS #1: RSA Cryptography Specifications Version 2.2," Request for Comments: 8017, pp. 1-78 (Nov. 2016).

* cited by examiner

This application is a continuation of International Application No. PCT/EP2016/066719, filed on Jul. 14, 2016, which is incorporated herein by reference in its entirety.

APPARATUS AND METHOD FOR CERTIFICATE ENROLLMENT

CROSS-REFERENCE TO RELATED APPLICATIONS

This application is a continuation of International Application No. PCT/EP2016/066719, filed on Jul. 14, 2016, which is incorporated herein by reference in its entirety.

TECHNICAL FIELD

The aspects of the present disclosure relate generally to public key cryptosystems and more particularly to public key infrastructure and digital certificates.

BACKGROUND

In modern computing systems, secure and trusted communications over public networks, such as the internet, is typically done using cryptography to digitally encrypt and/or sign data being transmitted over a public or otherwise unsecured network. These cryptosystems typically fall into two categories. Secret key cryptosystems are based on secret or symmetric keys and use the same cryptographic key to encrypt and decrypt data. Public key cryptosystems use a pair of keys, or a key pair, where one key is used to encrypt data and the second key is used to decrypt the data. Importantly, the key used to encrypt the data cannot be used to decrypt the data.

Managing cryptographic keys and issuing certificates to every device from every manufacturer can be a difficult task. In typical public key infrastructures, issuing certificates is facilitated through the use of a hierarchy of certificate authorities (CA). Certain CAs are known as root CAs and issue, or self-sign, their own certificates. The root CAs then issue certificates to subordinate or intermediate CAs which can issue certificates to user nodes or to additional subordinate CAs as desired. This hierarchy of root and subordinate CAs and the certificate chains they establish is referred to as a public key infrastructure (PKI).

Deploying a PKI capable of issuing certificates to all devices requires multiple CAs distributed around the globe and can be a very complex and expensive task. In typical PKIs the CAs are available only at manufacturing and repair time. Thus there is a need for an efficient and low cost apparatus and methods for issuing and distributing device certificates that do not constrain certificate enrollment and distribution to manufacturing and repair facilities.

In conventional systems the key pair is generally created during manufacturing where the private key is loaded into secure storage within a device. Later, when a legitimate application needs cryptographic operations requiring the private key, the application will send a request to the device to perform the cryptographic operation. The device will then: access the secure storage element to obtain the private key; extract the private key in plain text or clear text format; and use the private key to perform the requested cryptographic operation. This procedure involves many steps and exposes many security threats, such as for example when there are flaws in the implementation. Thus there is a need for improved methods and apparatus for providing cryptographic services that avoid the security threats exposed by the conventional approach.

Accordingly, it would be desirable to provide methods and apparatus that addresses at least some of the problems identified above.

SUMMARY

It is an object of the present invention to provide improved methods and apparatus that can efficiently generate and enroll certificates in a public key infrastructure in a cost effective fashion.

According to a first aspect of the present invention the above and further objects and advantages are obtained by an apparatus that includes a processor coupled to a memory wherein the processor and the memory are configured to provide a secure execution environment. The memory includes a shared secret value, and the processor is configured to receive a certificate, wherein the certificate includes a device identifier and a digital signature. The processor validates the certificate based on the digital signature and the device identifier, recovers a cryptographic key based on the shared secret value and the device identifier, and performs a cryptographic operation based on the recovered cryptographic key.

In a first possible implementation form of the apparatus according to the first aspect the certificate includes a diversifier value, and the processor is configured to validate the certificate based on the diversifier value, and to recover the cryptographic key based on the diversifier value. Including a diversifier value in the certificate and key generation process has the advantage of allowing the device key pair to be changed without affecting the device identifier and supports fast key recovery.

In a second possible implementation form of the apparatus according to the first aspect as such or according to the first possible implementation form of the first aspect the certificate includes an encrypted private key, and the processor is configured to decrypt the encrypted private key based on the recovered cryptographic key, and to perform the cryptographic operation based on the decrypted private key. Including an encrypted private key in the certificate has the advantage of allowing a specific key pair to be provided to the apparatus without requiring key derivation or use of a diversifier.

In a third possible implementation form of the apparatus according to the first aspect as such or according to the second possible implementation form of the first aspect the memory includes a hardware unique key. The processor is configured to decrypt the private key based on the hardware unique key, and perform the cryptographic operation based on the decrypted private key. Using a hardware unique key to encrypt the private key restricts access of the private key to a specific device.

In a fourth possible implementation form of the apparatus according to the first aspect as such or according to any of the preceding possible implementation forms of the first aspect the certificate includes a plurality of diversifier values. The processor is configured to recover a plurality of application cryptographic keys based on the shared secret value and the plurality of diversifier values. Each application cryptographic key in the plurality of application cryptographic keys is recovered based on a corresponding diversifier value in the plurality of diversifier values. Including a plurality of diversifier values in the certificate has the advantage of allowing multiple application specific keys to be distributed along with the device certificate.

In a fifth possible implementation form of the apparatus according to the first aspect as such or according to any one of the preceding possible implementation forms of the first aspect, the processor is configured to receive a public key corresponding to a certificate authority, and validate the certificate based on the public key. The public key is associated with a certificate authority, and the certificate is issued by the certificate authority.

In a sixth possible implementation form of the apparatus according to the first aspect as such or according to any one of the preceding possible implementation forms of the first aspect the processor is configured to verify that the cryptographic operation is allowed by the certificate, and when the cryptographic operation is allowed, perform the cryptographic operation. This allows a device policy to be included in the device certificate and to have the policy enforced by the device.

In a seventh possible implementation form of the apparatus according to the first aspect as such or according to any one of the preceding possible implementation forms of the first aspect the recovered cryptographic key corresponds to one of a symmetric cryptographic key and an asymmetric cryptographic key. This has the advantage of allowing either a public key or a secret key to be distributed via the device certificate.

In an eighth possible implementation form of the apparatus according to the first aspect as such or according to any one of the fourth through seventh possible implementation forms of the first aspect each application cryptographic key in the plurality of application cryptographic keys corresponds to one of a symmetric cryptographic key and an asymmetric cryptographic key. This has the advantage that the application keys may be based on either public key cryptography or secret key cryptography.

In a ninth possible implementation form of the apparatus according to the first aspect as such or according to any one of the preceding possible implementation forms of the first aspect the recovered cryptographic key is based on one or more of a digital encryption standard and an advanced encryption standard. Additional flexibility is provided by allowing various types of symmetric keys.

In a tenth possible implementation form of the apparatus according to the first aspect as such or according to any one of the preceding possible implementation forms of the first aspect the recovered cryptographic key is an asymmetric cryptographic key based on one of a Rivest, Shamir, and Adleman cryptographic algorithm and an elliptic curve cryptography algorithm. Additional flexibility is provided by allowing various types of public key cryptography.

In an eleventh possible implementation form of the apparatus according to the first aspect as such or according to the tenth possible implementation form of the first aspect the processor is configured to generate an asymmetric key pair by first generating a plurality of pseudo random bytes by applying a one-way function to the shared secret value, then generating the asymmetric key pair by applying a deterministic process to the plurality of pseudo random bytes. This provides an efficient and deterministic process for creation of the device key pair.

According to a second aspect of the present invention the above and further objects and advantages are obtained by a method for performing a cryptographic operation in a secure execution environment, wherein the secure execution environment includes a shared secret value. The method begins by receiving a certificate, wherein the certificate includes a device identifier, a diversifier value, and a digital signature. The certificate is validated based on the device identifier and the digital signature, a cryptographic key is recovered using the shared secret value and the device identifier, and the recovered cryptographic key is used to perform a cryptographic operation.

In a first possible implementation form of the method according to the second aspect as such the certificate includes a diversifier value and the certificate is validated based on the diversifier value. The cryptographic key is then recovered based on the diversifier value. Including a diversifier value in the device certificate allows the device keys to be updated without modifying the device identifier by distributing a new device certificate to the device.

In a second possible implementation form of the method according to the second aspect as such or according to the first possible implementation form of the second aspect, the certificate comprises a plurality of diversifier values, and the method comprises generating one or more application specific keys based on the plurality of diversifier values. Including multiple diversifier values in the certificate allows multiple application specific keys to be distributed via the certificate.

These and other aspects, implementation forms, and advantages of the exemplary embodiments will become apparent from the embodiments described herein considered in conjunction with the accompanying drawings. It is to be understood, however, that the description and drawings are designed solely for purposes of illustration and not as a definition of the limits of the disclosed invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which.

DETAILED DESCRIPTION OF THE DISCLOSED EMBODIMENTS

Figure 1:
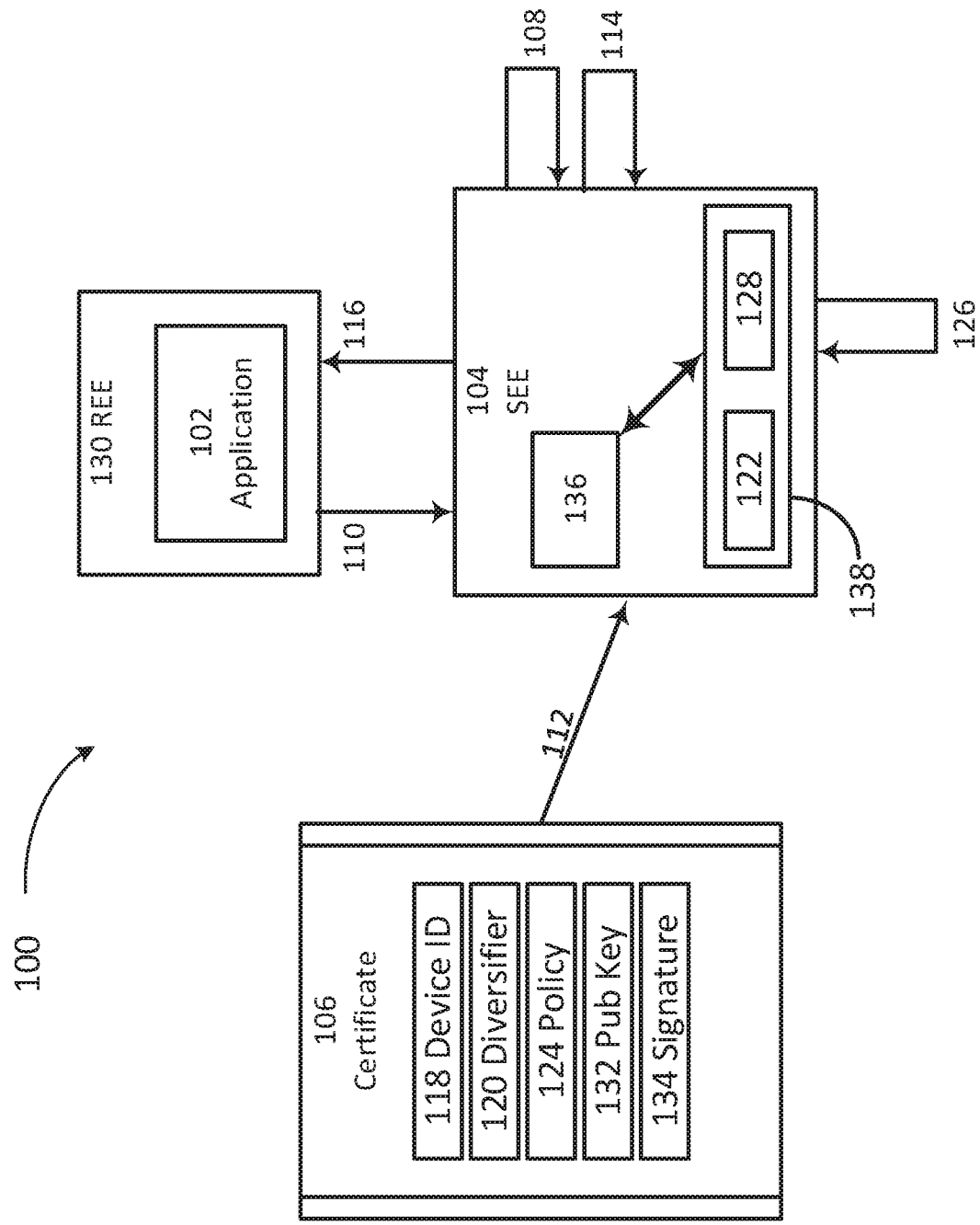
FIG. 1 illustrates a block diagram of an exemplary computing device for preforming cryptographic operations within a secure execution environment in accordance with the aspects of the disclosed embodiments.

FIG. 1 illustrates a block diagram of an exemplary apparatus for preforming cryptographic operations within a secure execution environment in accordance with the aspects of the disclosed embodiments. The aspects of the disclosed embodiments are directed to providing solutions for bootstrapping and enrolling device certificates in a public key infrastructure (PKI), and creating cryptographic systems that are more efficient and less complex than traditional symmetric key management systems where a database of confidential keys is shared between the parties. The exemplary embodiments described herein avoid the complexity in device certification, the storage of private keys, and cross certification. The aspects of the disclosed embodiments also provide an efficient system for certificate enrollment that allows dynamic bootstrapping of private key infrastructures without the complexities of multiple distributed certificate authorities (CA) or maintenance of large databases of cryptographic keys.

Referring to FIG. 1 there can be seen a diagram of a computing apparatus, generally indicated by numeral 100, that includes a secure execution environment (SEE) 104 and optionally a rich execution environment (REE) 130. As used herein the term "secure execution environment (SEE)" generally refers to a computing environment configured to ensure the confidentiality and integrity of computer programs and data that are executing or stored. A SEE is an execution environment configured to prevent viewing, copying, or altering of the program code and the associated data by untrusted parties. Any software programs and associated data executing within a SEE may include for example, key derivation functions (KDF) and key material, signing and encrypting algorithms, or other confidential information.

An application 102 executing in a rich execution environment (REE) 130 cannot safely perform cryptographic operations without risking loss of confidentiality or integrity of their keys and data. Examples of rich execution environments are those offered by mobile operating systems (OS) such as the Android OS developed by GOOGLE, and iOS developed by APPLE. Thus, when an application 102 executing in a REE 130, which is less secure than a SEE 104, requires a cryptographic operation based on a confidential private key, the application 102 sends a request 110 for the cryptographic operation to the SEE 104. The SEE 104 will securely recover the required confidential key, perform the desired operation, return the result, and discard the recovered key.

An example of a SEE 104 appropriate for execution of the aspects of the disclosed embodiments may be provided by a hardware security device such as a secure entity (SE) or similar hardware device configured to provide physical security as well as electrical and programmatic security to protect the confidentiality of computer software and key material contained within the hardware security device. Alternatively, as will be discussed further below and with reference to FIG. 2, the computing apparatus 100, including both the SEE 104 and the REE 130, may be formed as a single computing device or apparatus 200 where a portion of the processor 204 and memory 202 are configured to provide an appropriate SEE 104. This may be accomplished for example through technologies such as a trusted execution environment (TEE) where a secure portion of the main processor of a computing apparatus 100 such as a smart phone, tablet, or other portable or non-portable computing device, is configured to provide a SEE 104. These are just two examples, however any SEE configured to protect the confidentiality and integrity of program code and data may be used to provide an appropriately secure environment for the implementation or execution of the aspects of the disclosed embodiments.

In one embodiment, the SEE 104 includes a processor 136 coupled to a memory 138 where the memory includes a secure non-volatile computer memory, such as a one-time-programmable memory, configured to store a shared secret value 122.

When the SEE 104 is manufactured, such as during chipset manufacture or during a post manufacturing provision process, the shared secret value 122 is securely stored in the SEE 104 such that it is protected from viewing or tampering by unauthorized parties. The shared secret value 122 may be a cryptographic key or other appropriate key material adapted to be used as key material for deriving an asymmetric key pair or a symmetric key. The term "shared secret value" as used herein refers to key material or other appropriate data that may be used for deriving a secure cryptographic key or key pair. The shared secret value 122 need not be an actual cryptographic key, but only an appropriate starting value for derivation of a secure cryptographic key. According to aspects of the present disclosure the shared secret value 122 is known to a manufacturing environment, discussed further below, and to the computing apparatus 100 allowing the computing apparatus 100 and the manufacturing environment to independently derive the same asymmetric key pair, or symmetric key, based on the shared secret value 122.

Conventional key management solutions are based on static PKI bootstrapping or for symmetric key management scenarios, static provisioning of a shared secret key. As will be discussed further below, allowing the SEE 104 and the manufacturing device to independently derive the same keys based on the shared secret value 122, provides a flexible and dynamic mechanism for bootstrapping new PKI or new symmetric key infrastructure without the need for secure communication between the SEE 104 and the manufacturing environment.

The manufacturing environment, CA, or other provisioning environment provides the computing apparatus 100 with a device certificate 106. The device certificate 106 uses a digital signature 134 to cryptographically bind a device identifier 118 and a diversifier value 120 to a public key 132 and other subject information (not shown) associated with the computing apparatus 100. The device identifier 118 is a unique value associated with the SEE 104 and is publicly available in the device certificate 106. The device identifier 118 may also be stored in the SEE 104 as device identifier 128, and when desired may be used to ensure the SEE 104 will only perform cryptographic operations based on its own device identifier. The certificate 106 is loaded 112 into the SEE 104 where it can be validated based on the digital signature 134 and knowledge of the issuing CA.

In certain embodiments it is desirable to include policy information 124 in the digital certificate 106. Policy information 124 embedded in the device certificate 106 provides information about the types of cryptographic operations or security roles the SEE 104 is allowed to perform. These policies are checked 108 to verify that the requested cryptographic operation is allowed, i.e. the policy data in the device certificate allows or does not prohibit the requested operation. For example, if the policy information 124 embedded in the device certificate 106 does not allow the SEE 104 to issue a certificate, or the policies 124 do not allow the SEE 104 to act as a certificate authority, the SEE 104 is configured so it will not perform the prohibited operation When an application 102 requires a cryptographic operation it sends a request for a cryptographic operation 110 to the SEE 104. The application 102 may be executing in a REE 130 provided by the same computing apparatus 100. Alternatively, the request for a cryptographic operation 110 may be generated by an application 102 executing in a separate computing apparatus. (not shown) The digital certificate 106 may be loaded 112 at the time the request for a cryptographic operation 110 is received, or alternatively it may be loaded prior to receipt of the request 110 and stored in the SEE 104 where it may be retrieved as needed.

The SEE 104 derives or recovers 114 the private key associated with the public key 132 included in the device certificate 106 based on the shared secret 122, the device identifier 118, the device identifier 128, and/or the diversifier value 120. An advantage obtained by including the device identifier and/or diversifier value in the key recovery process is that the key pair can be changed, such as when the device changes ownership, by issuing a new certificate 106 that includes a new device identifier and/or diversifier value. Importantly, a new certificate 106 may be issued without bringing the computing apparatus 100 back to a secure facility.

One example of recovering the key pair 114 is based on applying a deterministic function F(•) to public values, such as the device identifier 118 and/or the diversifier value 120, encoded in the device certificate 106 along with the shared secret value 122. The term "recovering" is used herein to refer to the key derivation process to highlight that the same key or key pair can be derived or recovered at any time by applying a known deterministic process to the shared secret value 122 and public data encoded into the device certificate 106.

The private key may be recovered 114 for example based on a composite function F(id, D, K)=f(g(id, D, K)) where "id" is the device identifier 118, 128, D is a diversifier value 120, and K is the shared secret value 122. The device identifier, id, 118, 128, and the diversifier value, D, 120 provide a sort of public salt for the private key being recovered, and K is the shared secret value 122 seeded or stored into the SEE 104. Function g(•) is a one-way function. A one-way-function is a function in which knowledge of the output does not reveal the inputs used to generate that output. Some examples of one-way functions appropriate for use as the function g(•) are Key Derivation Functions or KDFs and keyed hash functions. The function g(•) produces a desired length set of pseudo random bytes based on the given inputs: id 118, 128, D 120, and K 122. Alternatively the deterministic function g(•) may include only one of the device identifier 118, 128 and the diversifier value 120. A deterministic process f (•) may then be applied to the output of g(•) to produce the key 114.

An example composite function F(id, D, K) appropriate for recovering 114 an asymmetric key or key pair may be illustrated using RSA public key cryptography with a 2048-bit key size. The function g(•) can be configured to produce a string of 256 bytes, represented as U concatenated with V (U|V) where U contains the first 128 bytes and V contains the last 128 bytes. The deterministic function f(•) can be a procedure where the most significant bits of U and V are set to one (1). This guarantees that integer representations of U and V are 1024 bits in length. The function f(•) then finds the smallest values a and b such that U+a and V+b are both prime numbers. These two large prime numbers, p=U+a, and q=V+b, form the bases of the RSA key generation and can be used to find the modulus n=p*q. The RSA private key may then be represented as the tuple (n, d) where n is the modulus described above and d is the private exponent. The final step of the example function f(•) is to derive the public key from the private key. Full details of the RSA key generation process can be found in the Public Key Cryptography Standard #1 (PKCS #1).

Once the key has been recovered 114, it may be used to perform 126 the requested cryptographic operation and return 116 the result to the requesting application 102.

Figure 2:
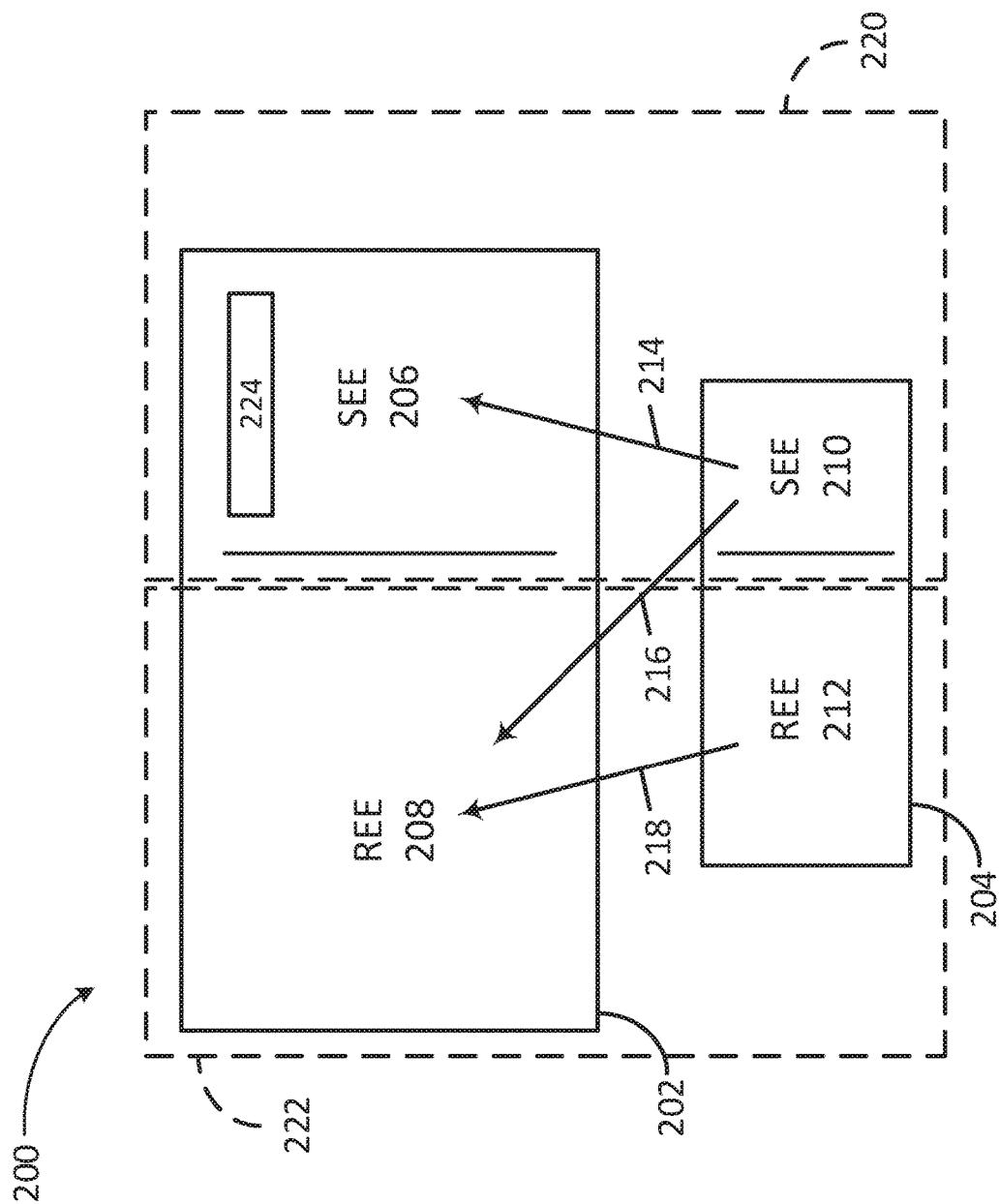
FIG. 2 illustrates a block diagram of an exemplary computing apparatus appropriate for implementing the aspects of the disclosed embodiments.

FIG. 2 illustrates a block diagram of an exemplary computing apparatus 200 appropriate for implementing the methods and apparatus generally disclosed herein, such as the computing apparatus 100 described above with respect to FIG. 1. The computing apparatus 200 may be incorporated into various types of connected computing devices such as mobile phones, phablets, tablet computers, laptop computers, set top cable boxes, televisions, automobiles, etc., and can be advantageously employed to provide efficient certificate enrollment and secure cryptographic services to enhance the security and functionality provided by the computing apparatus 200. As shown in the example of FIG. 2, the computing apparatus 200 is configured to provide a SEE 220, appropriate for use as the SEE 104 described above with respect to FIG. 1. The computing apparatus 200 can also include a REE 222, such as the REE 130 described above with respect to FIG. 1.

In the example of FIG. 2, the computing apparatus 200 includes a processor 204 coupled to a memory 202. The processor 204 is configured to support the SEE 220 and REE 222. As shown in FIG. 2, the processor 204 includes a first SEE portion 210 and a second REE portion 212. The memory 202 includes a first SEE portion 206 and a second REE portion 208. In this example, at least the first SEE portion 210 of the processor 204 and the first SEE portion 206 of the memory 202 are configured to support the SEE 220. At least the second REE portion 212 of the processor 204 and the second REE portion 208 of the memory 202 are configured to support the REE 222. The illustrated apparatus 200 where a single processor 204 and memory 202 are adapted to provide both a SEE 220 and a REE 222 may be implemented for example through a technology such as the TEE described above. Although the memory 202 and processor 204 are described herein with reference to a first portion and a second portion, the aspects of the disclosed embodiments are not so limited. In alternate embodiments, the memory 202 and processor 204 can be configured in any suitable manner to provide the SEE 104, 220 and REE 130, 222, as is generally described herein.

The processor 204 may be a single processing device or may comprise a plurality of processing devices including special purpose devices, such as for example, digital signal processing (DSP) devices, microprocessors, specialized processing devices, or general purpose computer processors. The processor 204 is configured to read program instructions from a memory 202 and perform the methods and processes described herein. The processor may also include a CPU working in tandem with a graphics processing unit (GPU) and may include a DSP or other specialized processing hardware.

The memory 202 may be a combination of various types of volatile and non-volatile computer memory such as for example read only memory (ROM), random access memory (RAM), magnetic or optical disk, or other types of computer memory. The memory 202 stores computer program instructions that may be accessed and executed by the processor 204 to cause the processor to perform a variety of desirable computer implemented processes or methods such as cryptographic key derivation and other cryptographic methods described herein.

As noted above, the first SEE portion 210 of the processor 204, referred to herein as a "secure portion 210" of the processor 204, and the first SEE portion 206 of the memory 202, referred to as the "secure portion 206" of the memory 202 are adapted to provide a SEE 220. Similar to the SEE 104 described above with respect to FIG. 1, the SEE 220 is configured to ensure the confidentiality and integrity of data and computer programs stored within the first SEE portion 206 of memory 202, and to protect computer programs executing within the secure first SEE portion 210 of the processor 204. The SEE 220 may be implemented for example using various technologies such as a trusted execution environment.

To support key recovery a shared secret value 224, similar to the shared secret value 122 described with respect to FIG. 1, may be stored in the first SEE portion 206 of the memory 202. This secure first SEE portion 206 of the memory 202 may be provided by one time programmable memory or other secure non-volatile type computer memory as desired. In certain embodiments it may be desirable to implement the SEE 220 as a distinct hardware security device or other physically secure processing apparatus such as a SE coupled to the REE 222 via a memory or other type of computer interface. Use of a hardware security device or SE may be desirable based on security and other requirements imposed by a particular use or application of the aspects of the disclosed embodiments.

Figure 3:
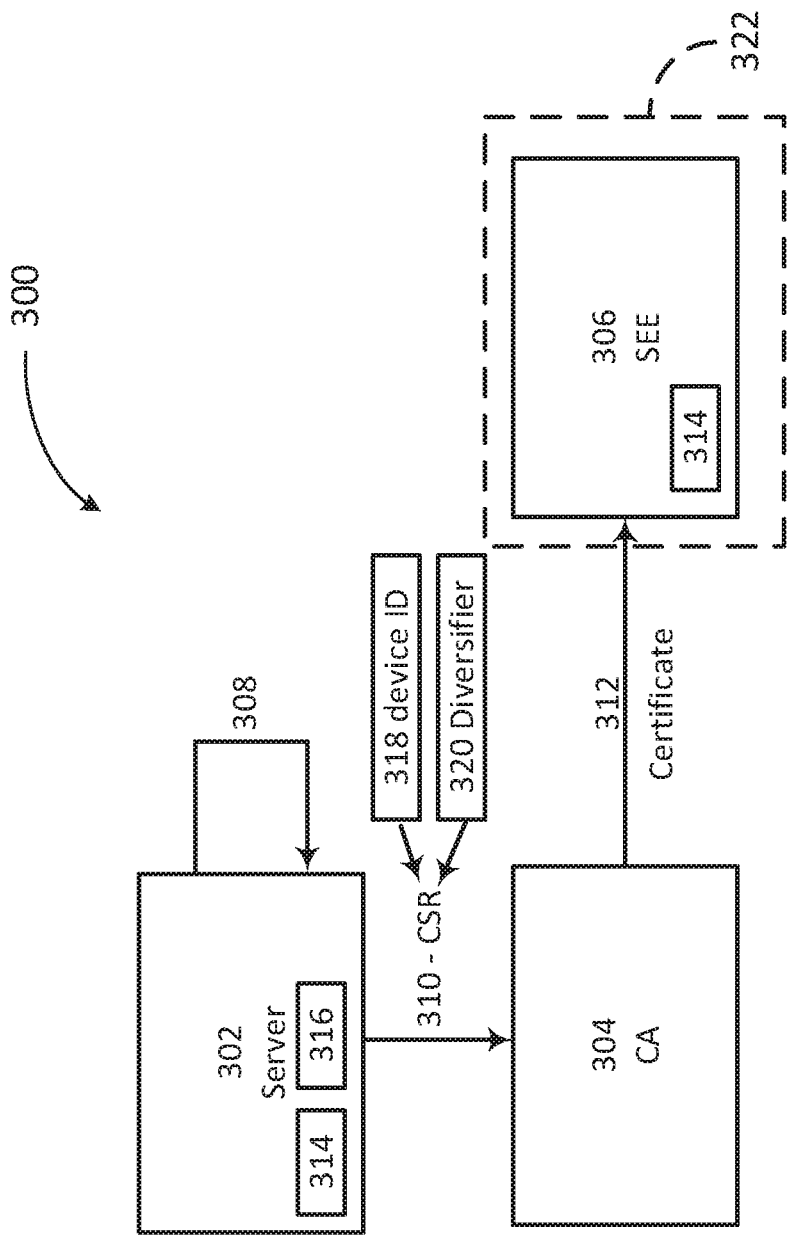
FIG. 3 illustrates a block diagram of an exemplary process configured to generate a device certificate incorporating aspects of the disclosed embodiments.

FIG. 3 illustrates a block diagram of an exemplary process 300 configured to generate a device certificate 312, such as the device certificate 106 described above with respect to FIG. 1. In this embodiment, the device certificate 312 is configured for use by a SEE 306 which may be any suitable type of SEE such as the SEE 104 or 220 described above with respect to FIGS. 1 and 2. The SEE 306 in this example may be contained in a computing device 322 or may itself be a separate computing device. The SEE 306 is seeded with a share secret value 314 during chipset manufacturing or provisioning of the SEE 306 where the shared secret value 314 is known to both the SEE 306 and the manufacturing or provisioning environment 302. The shared secret value 314 may be any suitable key material as described above. In certain embodiments it is desirable to include additional key material that is not shared and is known only to the SEE 306. Such confidential key material that is not shared outside the SEE 306 is referred to herein as a hardware unique key.

Generation of a device certificate 312 requires deriving a public private key pair 316. In the example of FIG. 3, the key pair 316 is recovered or derived 308 within a server 302, which in this example is a secure environment. The server 302 can be a manufacturing server or other manufacture, repair, or provisioning environment. In one embodiment, recovering 308 of the key pair 316 is based on applying a deterministic function to the publicly available device identifier 318 and diversifier value 320 along with the confidential shared secret value 314.

The derived key pair 316 is then used to create a CSR 310. The diversifier value 320 is included in the CSR 310 along with the public key from the key pair 316 and device identifier 318. The CSR 310 is signed with the private key derived with the key pair 316. The CSR 310 is then sent to a CA 304 for generation and signing of a device certificate 312. The CA 304 can be any CA in which the device can later establish trust, either directly, or through a chain of trust. The CA 304 generates a device certificate based on the generated CSR 310. The resulting device certificate 312 is then sent to the SEE 306.

In conventional PKI generation, the device key pair is generated either within the device or in a secure environment while the device is being manufactured or provisioned. Since the private key is a highly confidential credential it is desirable to generate it internally within the device or SEE of the device and never expose it in a clear form outside the SEE. However, generation of a device key pair is a computationally complex task and can significantly slow down the manufacturing process. Processing speed and processing resources may be limited in low end or low cost devices resulting in extended amounts of time to generate the key pair. For example, RSA key generation can often take several seconds and in very low end devices may extend to minutes. The aspects of the disclosed embodiments reduce the time necessary to generate the key pair 316 by allowing the server 302 to independently recover 308 the key pair 316 at any time without communicating or involving the SEE 306. This reduces the time and complexity of manufacturing each computing device 322.

To obtain a signed device certificate 312, a CSR 310 corresponding to the SEE 306 needs to be created and signed with the private key of the SEE 306. Creation of the CSR 310 requires complex software libraries for assembling and encoding information into the CSR 310. Examples of conventional encoding standards include the Abstract Syntax Notation 1 (ASN1) encoding rules, and distinguished encoding rules (DER). Including software libraries to perform encoding of information into the CSR 310 within the SEE 306 can increase the cost and complexity of the device and adversely impact security.

Recovering 308 the key pair 316 and generating the CSR 310 externally, in accordance with the aspects of the disclosed embodiments as described above, eliminates the need to derive the key pair 316 and generate the CSR 310 within the SEE 306 thereby reducing the complexity and time for manufacturing the SEE 306. The device certificate 312 can be generated even before the SEE 306 is manufactured as long as a device identifier 318 has been allocated for the SEE 306. The device certificate 312 may be sent to the SEE 306 or to the computing device 322 at any time during the device 322 lifecycle and a new device certificate 312 can be created and sent as often as desired.

In certain embodiments it is advantageous to have several unique cryptographic keys available in a SEE 306, where each key is specific to a particular application or group of applications. When this is desired, the aspects of the disclosed embodiments may be advantageously employed to generate a device certificate 312 that includes multiple diversifier values 320, where each diversifier value 320 may be used to recover a different application specific key. A person skilled in the art can for example envision a scenario where a service provider may issue an updated or new device certificate 312 each time a user downloads and installs an application requiring its own cryptographic key.

Figure 4:
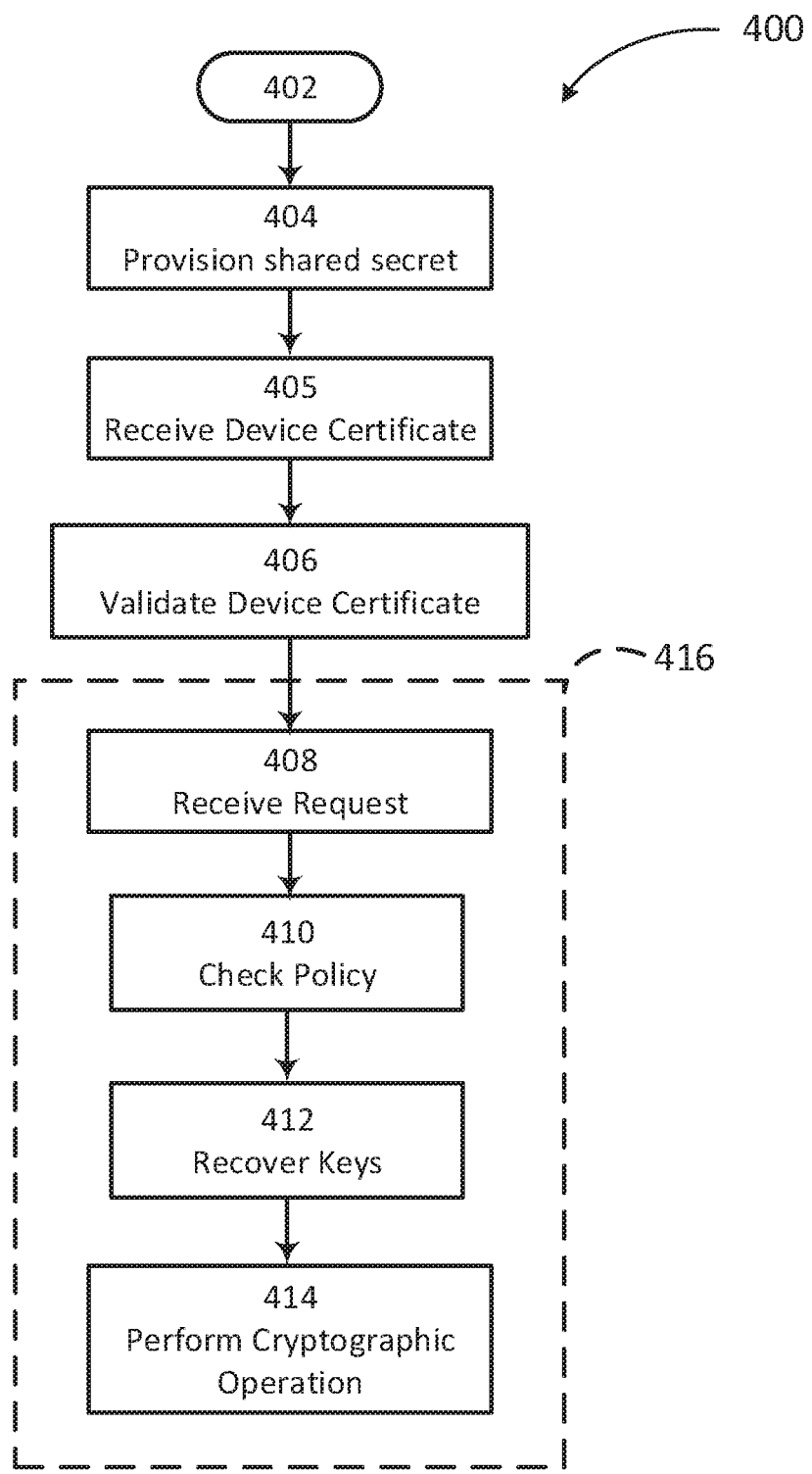
FIG. 4 illustrates an exemplary method for performing cryptographic operations incorporating aspects of the disclosed embodiments.

Referring now to FIG. 4 there can be seen an illustration of an exemplary method 400 for performing cryptographic operations in a computing apparatus according to the aspects of the disclosed embodiments. The exemplary method 400 is appropriate for use in a computing apparatus such as any of the computing apparatus 100, the computing apparatus 200, and the computing device 322 described above. Aspects of the exemplary method 400 are directed to providing cryptographic operations based on keys recovered from a device certificate where the device certificate may be issued independently of any computing apparatus and may be issued even before the associated computing apparatus has been manufactured.

The exemplary method 400 begins 402 after a computing device or SEE has been manufactured. Alternatively, portions of the method 400, such as provisioning or loading 404 the shared secret value into the SEE may be integrated into the manufacturing process and performed prior to completing manufacture of the device.

A shared secret value, such as a cryptographic key or other appropriate key material, is loaded 404 into a SEE. This key material is shared between the SEE and a manufacturing or other secure provisioning environment and when desired may be shared among an entire class or geographic distribution of computing devices. The shared secret value allows both the SEE and the provisioning environment to recover the same values, such as an asymmetric key pair or a symmetric key, based on the shared secret value.

At a time after the SEE has been provisioned with the shared secret value 404, a digital certificate, or device certificate is loaded 405 and validated 406 in the SEE. The device certificate, which may be a device certificate 106 as described above, includes a device identifier, the public key of the computing device executing the method 400, and optionally a diversifier value. Other information may also be included in the device certificate as desired, such as policy information and additional subject or owner information. The device key pair, i.e. the public and private keys of the device, are derived based on the shared secret value, the device identifier value and/or the diversifier value. The SEE can therefore derive the private key associated with the public key of the certificate based only on public information incorporated into the certificate and the shared secret value loaded 404 into the device. This device certificate is signed by a certificate authority (CA) thereby cryptographically binding the device certificate information with a signature that may be validated based on a digital certificate associated with the CA.

The device certificate may optionally be validated 406 before performing any cryptographic operations. The certificate may be validated based on the data encoded into the certificate and a digital signature appended to the device certificate. Validation of the device certificate may be done such as by obtaining a copy of the public key of the issuing CA through an alternate trusted channel and then using the CA's public key to verify that the signature appended to the device certificate corresponds to the data encoded into the device certificate. Trust of the device certificate may be established directly when the issuing CA is a trusted CA or a trusted root CA. Alternatively a chain of trust may be established by performing chain validation through recursive validation of the issuing CA certificates until a trusted CA is reached.

An advantage of the method 400 is that the device certificate may be generated by the provisioning environment without contacting the SEE or having the SEE generate a certificate signing request (CSR). Any secure provisioning environment that has access to the shared secret value may generate a device certificate for the device using the shared secret along with other information embedded in the device certificate to derive the device key pair. This allows a new certificate and a new device key pair to be generated at any time, and as often as desired, during the device's lifecycle such as when the device ownership changes or when the device is to be used for a new purpose. The new device certificate may then be loaded 405 and validated 406 in the device without returning the device to a secure environment such as a manufacturing or repair facility.

After the device certificate is loaded 405 into the SEE and validated 406, a set of cryptographic operations is performed 416. The set of cryptographic operations is initiated when the SEE receives 408 a request to perform a cryptographic operation. When a request for a cryptographic operation is received 408, the SEE checks 410 one or more policies embedded in the device certificate. Policies embedded in the device certificate provide information about the types of cryptographic operations or security roles the SEE is allowed to perform. These policies are checked 410 to verify that the requested cryptographic operation is allowed, i.e. the policy data in the device certificate allows or does not prohibit the requested operation.

Cryptographic keys necessary for the requested cryptographic operation are recovered 412 based on the shared secret value, a device identifier, and a diversifier value obtained from the device certificate. Alternatively, the cryptographic key may be recovered 412 based on only one of the device identifier or the diversifier value. Because the cryptographic key, or key pair, is recovered based on information from the device certificate, the cryptographic key or key pair may be changed at any time by loading a new device certificate containing a new device identifier and/or diversifier value.

The derived cryptographic key is then used to perform 414 a cryptographic operation. The cryptographic operation that is performed may include any desired cryptographic operation allowed by the policy embedded in the certificate, such as but not limited to, signing data, validating a signature, and encrypting data.

In alternate embodiments a device certificate may be loaded 405 and validated 406 each time a request 408 for a cryptographic operation is received. This allows a single SEE to perform cryptographic operations based on different device certificates with different device identifiers thereby providing additional flexibility. Alternatively, when greater security is desired, a device identifier may be loaded 404 within the SEE along with the shared secret value. The SEE can then be configured to perform cryptographic operations only when the device identifier embedded in the device certificate matches with the device identifier stored in the SEE.

In certain embodiments it is beneficial to embed a private key within the device certificate along with the device identifier and/or the diversifier value. The embedded private key can be encrypted using the cryptographic key recovered at step 412. This allows a manufacturing or provisioning environment to securely send a private key to the SEE at any time subsequent to manufacture. The SEE may then decrypt the private key using the recovered cryptographic key and use it in conjunction with the public key embedded in the certificate for cryptographic operations based on the new key pair. This approach is useful when the private key is relatively short, such as when using ECC where keys may be two hundred and fifty six (256) bits long.

Alternatively, an encrypted private key may be embedded in the device certificate by encrypting the private key with a hardware unique key. The certificate containing the encrypted private key may then be loaded into the SEE where it may be validated 406. The hardware unique key is a confidential key or key material that is known only to the SEE, and is not shared with any other entity such as a manufacturing or provisioning environment. The hardware unique key may be used by the SEE to encrypt or wrap a private key. The encrypted, or wrapped, private key can be delivered to a CA, such as by including it in a CSR, and the CA can then include the encrypted private key in the device certificate.

Encoding multiple diversifier values into the device certificate loaded at step 405 is advantageous for example when it is desired to have multiple application specific keys available within the SEE. The application specific keys may be based on the diversifier value alone or when desired they can be tied to a particular device by including both the diversifier value and the device identifier in the key recovery process performed at step 412. As in any of the disclosed embodiments, the cryptographic keys recovered in step 412 may be either symmetric or asymmetric keys as desired.

Recovering 412 an asymmetric key pair from the device identifier and optionally a diversifier value embedded within the certificate provides numerous advantages. The need for static provisioning or PKI bootstrapping can be avoided by recovering the cryptographic key or key pair from information included in the device certificate. This allows PKI bootstrapping or shared secret provisioning to be done at any time during the device lifecycle and be repeated as often as necessary without returning the device to a secure environment. The aspects of the disclosed embodiments may also be used to eliminate the need for maintaining a large database of symmetric keys within a key management system. By using the same shared secret value for an entire class or geographic group of devices, a large number of devices, each with their own unique set of keys, may be supported based on a single shared secret value. When the same shared secret is used for an entire class or group of devices the shared secret may be referred to as a class unique key.

The aspects of the disclosed embodiments eliminate the requirement for bookkeeping or secure data storage for every individual device. Once a device is provisioned with the shared secret value and corresponding device identifier, a device certificate may be generated without further communication with the provisioned device. Unlike conventional approaches, there is no need to collect and track the device identifiers, diversifier values, or keys during manufacture or provisioning. The device identifier and diversifier values are publicly available in the device certificate and can therefore be collected at any time.

Figure 5:
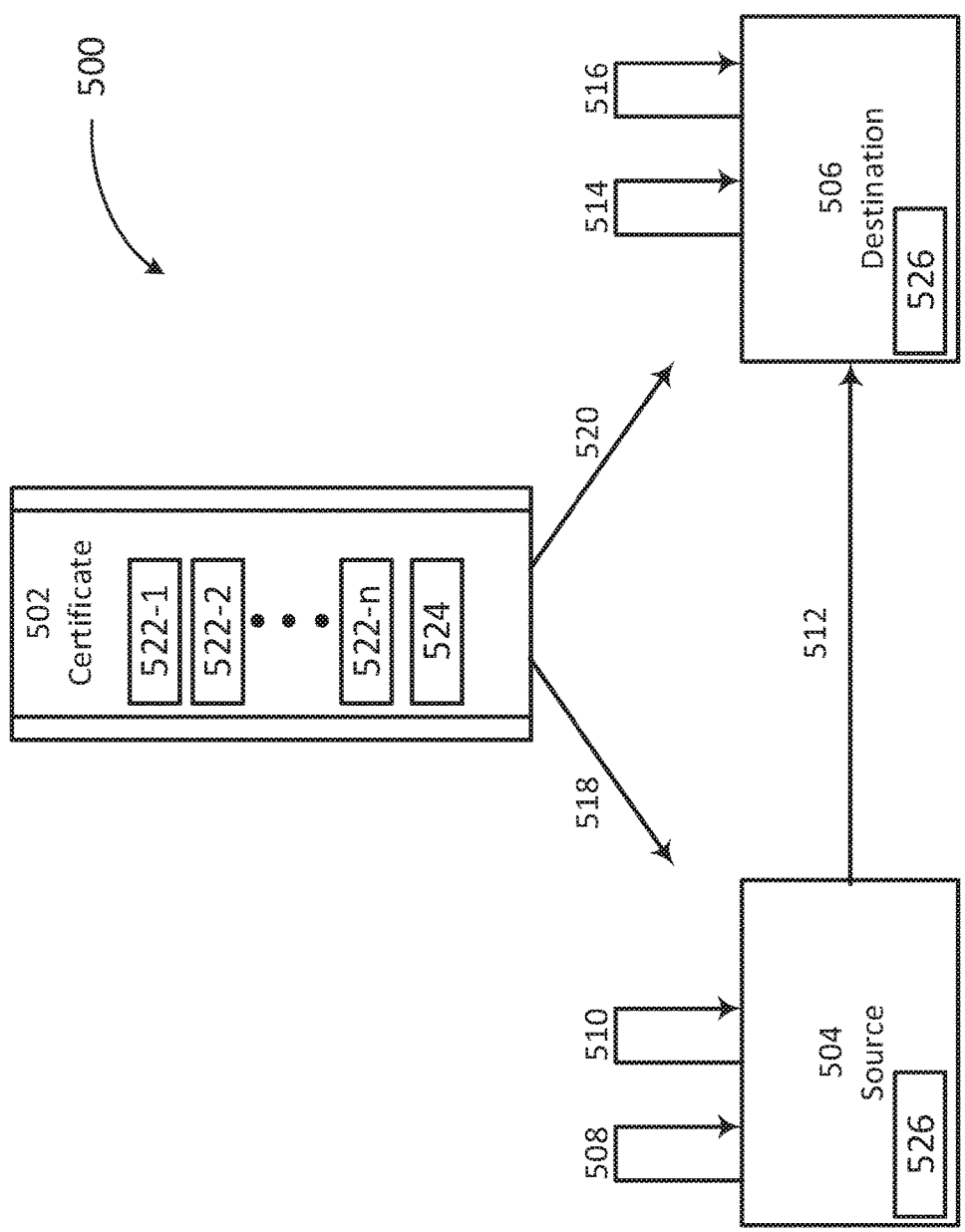
FIG. 5 illustrates an exemplary system for distributing and using a set of cryptographic keys in accordance with the aspects of the disclosed embodiments.

FIG. 5 illustrates a block diagram of an exemplary system 500 for deriving and using a set of application specific keys based on a set of diversifier values 522-1 through 522-n embedded in a device certificate 502. The device certificate 502 is similar to the device certificate 106 described above with reference to FIG. 1 and may incorporate a device identifier 524 and other desired information such as a public key and policy information. The set of diversifier values 522-1 through 522-n may be used to derive an associated set of application specific keys. The device certificate 502 can be created through any suitable process such as the process 300 described above and with reference to FIG. 3.

The exemplary system 500 illustrates a solution where a source SEE 504 and a destination SEE 506 require secure communication of confidential information. The exemplary system 500 is beneficial for example to securely distribute multiple application specific keys among distributed SEE devices 504, 506 thereby providing a means for the SEE devices 504, 506 to securely communicate with each other.

The device certificate 502 is loaded 518, 520 into both the source SEE 504 and the destination SEE 506. The source SEE 504, and the destination SEE 506 are configured to protect their respective copies of shared secret value 526 as well as provide a secure environment for recovering and using the application specific keys derived from information incorporated into the device certificate 502. The application specific keys are derived from the diversifier values 522-1 through 522-n when needed and may be discarded after use rather than storing them in the SEE 504, 506. These application specific keys may be used for example to secure communications between the source SEE 504 and the destination SEE 506.

As an aide to understanding consider the case when an application, referred to in this example as application j or the $j^{th}$ application, needs to send confidential information from the source SEE 504 to the destination SEE 506. When each SEE 504, 506 is manufactured, or at any later time prior to the data transfer, a device certificate 502 is sent 518, 520 to each SEE 504, 506. Alternatively, the source SEE 504 and destination SEE 506 may each have their own unique device certificate, as long as both the device certificates include the same application specific diversifier value 522-j for the $j^{th}$ application.

To begin a secure data transfer from the source SEE 504 to the destination SEE 506, the source SEE 504 derives an application specific key 508 using the $j^{th}$ diversifier value 522-j. The derived 508 key may be an asymmetric key such as an RSA or ECC key. Alternatively, the derived 508 key may be a symmetric key such as an advanced encryption standard (AES) encryption key. The data to be transferred from the source SEE 504 to the destination SEE 506 is encrypted 510 using the derived application specific key and prepared for transfer as required by the particular application. The encrypted data is then sent 512 to the destination SEE 506.

The destination SEE 506 uses its own copy of the shared secret value 526 along with the $j^{th}$ diversifier value obtained from the certificate 502 to recover 514 the application specific key for the $j^{th}$ application. The recovered key 514 may then be used to decrypt 516 the received data. In this fashion, encrypted data may be exchanged between the two SEEs 504, 506 without exposing the recovered 508, 514 application keys outside of a SEE 504, 506 and without having to provision each SEE 504, 506 with the same unique application specific key. The foregoing example illustrates encrypting and decrypting data with recovered application specific keys, however those skilled in the art will readily recognize that any desired cryptographic operation may be performed without straying from the spirit and scope of the disclosed embodiments.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the presently disclosed invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. An apparatus configured to operate in a secure execution environment, the apparatus comprising:
  a memory; and
  a processor coupled to the memory,
  wherein the memory is configured to store a shared secret value,
  wherein the processor is configured to:
    receive a certificate, wherein the certificate comprises a device identifier, a digital signature, and a plurality of diversifier values;
    validate the certificate based on the digital signature and the device identifier;
    recover a cryptographic key based on the shared secret value, the device identifier, and a diversifier value of the plurality of diversifier values; and perform a cryptographic operation based on the recovered cryptographic key, and
wherein the plurality of diversifier values are public values.

2. The apparatus of claim 1, wherein the certificate is validated further based on the diversifier value.

3. The apparatus of claim 1, wherein the certificate comprises an encrypted private key, and the processor is further configured to decrypt the encrypted private key based on the recovered cryptographic key, and
wherein the cryptographic operation is performed further based on the decrypted private key.

4. The apparatus of claim 3, wherein the memory is further configured to store a hardware unique key,
wherein the private key is decrypted further based on the hardware unique key, and
wherein the cryptographic operation is performed further based on the decrypted private key.

5. The apparatus of claim 1, wherein the processor is further configured to receive a public key corresponding to a certificate authority,
wherein the certificate is validated further based on the public key, and
wherein the public key is associated with a certificate authority, and the certificate is issued by the certificate authority.

6. The apparatus of claim 1, wherein the processor is further configured to verify that the cryptographic operation is allowed by the certificate, and
wherein the cryptographic operation is performed in response to the cryptographic operation being allowed.

7. The apparatus of claim 1, wherein the recovered cryptographic key corresponds to one of a symmetric cryptographic key and an asymmetric cryptographic key.

8. The apparatus of claim 1, wherein the recovered cryptographic key is based on one or more of a digital encryption standard and an advanced encryption standard.

9. The apparatus of claim 1, wherein the recovered cryptographic key is an asymmetric cryptographic key based on one of a Rivest, Shamir, and Adleman cryptographic algorithm and an elliptic curve cryptography algorithm.

10. The apparatus of claim 9, wherein the processor is further configured to generate an asymmetric key pair by:
generating a plurality of pseudo random bytes by applying a one-way function to the shared secret value; and
generating the asymmetric key pair by applying a deterministic process to the plurality of pseudo random bytes.

11. The apparatus of claim 1, wherein the processor is further configured to generate an application specific key based on the diversifier value of the plurality of diversifier values.

12. The apparatus of claim 1, wherein the processor is further configured to generate different application specific keys based on different diversifier values of the plurality of diversifier values.

13. The apparatus of claim 1, wherein the diversifier value and the device identifier are configured to function as a public cryptographic salt.

14. A method for performing a cryptographic operation in a secure execution environment using a shared secret value, the method comprising:
receiving a certificate, wherein the certificate comprises a device identifier, a plurality of diversifier values, and a digital signature;
validating the certificate based on the device identifier and the digital signature;
recovering a cryptographic key based on the shared secret value, the device identifier, and a diversifier value of the plurality of diversifier values; and
performing a cryptographic operation based on the recovered cryptographic key,
wherein the plurality of diversifier values are public values.

15. The method of claim 14, wherein the certificate is validated further based on the diversifier value.

16. The method of claim 14, further comprising generating an application specific key based on the diversifier value of the plurality of diversifier values.

17. The method of claim 14, wherein the certificate comprises an encrypted private key, and the method further comprises decrypting the encrypted private key based on the recovered cryptographic key, and
wherein the cryptographic operation is performed further based on the decrypted private key.

18. A non-transitory computer readable medium having a program code stored thereon that, when executed by a computer, causes the computer to perform a method for performing a cryptographic operation in a secure execution environment using a shared secret value, the method comprising:
receiving a certificate, wherein the certificate comprises a device identifier, a plurality of diversifier values, and a digital signature;
validating the certificate based on the device identifier and the digital signature;
recovering a cryptographic key based on the shared secret value, the device identifier, and a diversifier value of the plurality of diversifier values; and
performing a cryptographic operation based on the derived cryptographic key,
wherein the plurality of diversifier values are public values.

19. The non-transitory computer readable medium of claim 18, wherein the certificate is validated further based on the diversifier value.

20. The non-transitory computer readable medium of claim 18, wherein the method further comprises generating an application specific key based on the diversifier value of the plurality of diversifier values.

21. The non-transitory computer readable medium of claim 18, wherein the certificate comprises an encrypted private key, and the method further comprises decrypting the encrypted private key based on the recovered cryptographic key, and
wherein the cryptographic operation is performed further based on the decrypted private key.

* * * * *